United States Patent
Nabuurs et al.

[11] Patent Number: 6,012,768
[45] Date of Patent: Jan. 11, 2000

[54] OPEN ROOF CONSTRUCTION FOR A VEHICLE

[75] Inventors: Martinus Wilhelmus Maria Nabuurs, Overloon; Petrus Christiaan Martinus Lenkens, Beugen, both of Netherlands

[73] Assignee: Inalfa Industries B.V., Netherlands

[21] Appl. No.: 09/103,204

[22] Filed: Jun. 23, 1998

[30] Foreign Application Priority Data

Jul. 1, 1997 [NL] Netherlands ............ 1006437

[51] Int. Cl.$^7$ .................................. B60J 7/047
[52] U.S. Cl. ....................... 296/216.03; 296/224
[58] Field of Search ................ 296/216.02, 216.03, 296/216.04, 216.05, 220.01, 223, 224

[56] References Cited

U.S. PATENT DOCUMENTS

| | | | |
|---|---|---|---|
| 4,407,541 | 10/1983 | Boots . | |
| 4,602,815 | 7/1986 | Boots et al. | 296/222 |
| 4,877,285 | 10/1989 | Huyer | 296/223 X |
| 5,259,662 | 11/1993 | Huyer | 296/221 |
| 5,288,125 | 2/1994 | Huyer | 296/223 X |

FOREIGN PATENT DOCUMENTS

| 4227400 | 2/1994 | Germany | 296/216.05 |
|---|---|---|---|

*Primary Examiner*—Dennis H. Pedder
*Attorney, Agent, or Firm*—Westman, Champlin & Kelly, P.A.

[57] ABSTRACT

An open roof construction for a vehicle having an opening in its fixed roof comprises a stationary part to be secured to the roof of the vehicle and a movable closing element, which is movably supported by said stationary part and which can be adjusted by a drive unit. The closing element can move between a closed position, and an open, rearward position, at least partially above the fixed roof, in which position the roof opening is at least partially cleared. The stationary part is fitted with at least a first longitudinal guide extending along the roof opening, and with a second longitudinal guide on the fixed rood, rearward of the roof opening. The closing element is supported near its front side by a slideshoe which is slidably supported in said first longitudinal guide, and rearward thereof it is supported by a guide element which is capable of sliding movement in said longitudinal guide. The second longitudinal guide comprises a front, short, substantially vertical part and an upwardly and rearwardly extending part which joins said part upwardly thereof. The closing element comprises a locking mechanism on its rear side, which is driven by said drive unit, which locking mechanism temporarily engages the closing element near the closed position, and which effects the movement of the closing element when the guide element of the closing element is present in said at least approximately vertical part of said second longitudinal guide.

5 Claims, 6 Drawing Sheets

OPEN ROOF CONSTRUCTION FOR A VEHICLE

BACKGROUND OF THE INVENTION

1. Field of the Invention

The present invention relates to an open roof construction for a vehicle having an opening in its fixed roof, which construction comprises a stationary part to be secured to the roof of the vehicle and a movable closing element, which is movably supported by said stationary part and which can be adjusted by a drive unit, which closing element is adapted to move between a closed position, in which the roof opening is closed, and an open, rearward position, at least partially above the fixed roof, in which the roof opening is at least partially cleared, whereby the stationary part is provided with at least a first longitudinal guide extending along the roof opening, and with a second longitudinal guide on the fixed roof, rearward of the roof opening, whilst the closing element is supported near its front side by a slideshoe which is slidably supported in said first longitudinal guide, and which is supported, rearward thereof, by a guide element which is capable of sliding movement in said longitudinal guide.

2. Description of the Related Art

An open roof construction of this kind is known in various versions thereof, for example from FR-A-2.384.640, from DE-C-42 38 944 and from EP-B-0 584 596.

SUMMARY OF THE INVENTION

The object of the present invention is to further improve such an open roof construction.

In order to accomplish that objective, the invention provides an open roof construction as defined in the accompanying claims.

The invention will now be described with reference to the drawings, which diagrammatically show an embodiment of the open roof construction.

DESCRIPTION OF THE PREFERRED EMBODIMENTS

The drawings show an embodiment of an open roof construction for a vehicle, in particular a motor vehicle such as a car. This vehicle is provided with an opening 1 in its fixed roof 2, whereby it is noted that said fixed roof 2 may either form part of the vehicle or of the open roof construction itself, which in that case makes up the entire roof of the vehicle.

The open roof construction comprises a stationary part, such as a frame 3, and a closing element, in this case in the form of a rigid and preferably transparent panel 4, for example made of glass or of plastic material, which is movably supported by frame 3. In this embodiment panel 4 is movable between a closed position, in which roof opening 1 is closed and panel 4 is at least substantially coplanar with the fixed roof 2, and an open position, in which panel 4 occupies a rearward position, at least partially above fixed roof 2, in which a very large part of opening 2 is cleared.

A mechanism 5 is provided on each longitudinal side of panel 4 for effecting the movements of panel 4, which mechanism supports panel 4 and which is guided in a first longitudinal guide 6, which forms part of frame 3 and which extends along the side edge of roof opening 1, at a lower level than fixed roof 2. Furthermore, a second longitudinal guide 7 is provided, namely on the fixed roof, substantially rearward of the roof opening 1 and at a higher level than the first longitudinal guide 6. In this case the second longitudinal guide 7 extends, as seen in lateral direction, outwardly of first longitudinal guide 6, and also outwardly of the side edges of panel 4.

Figure 2:
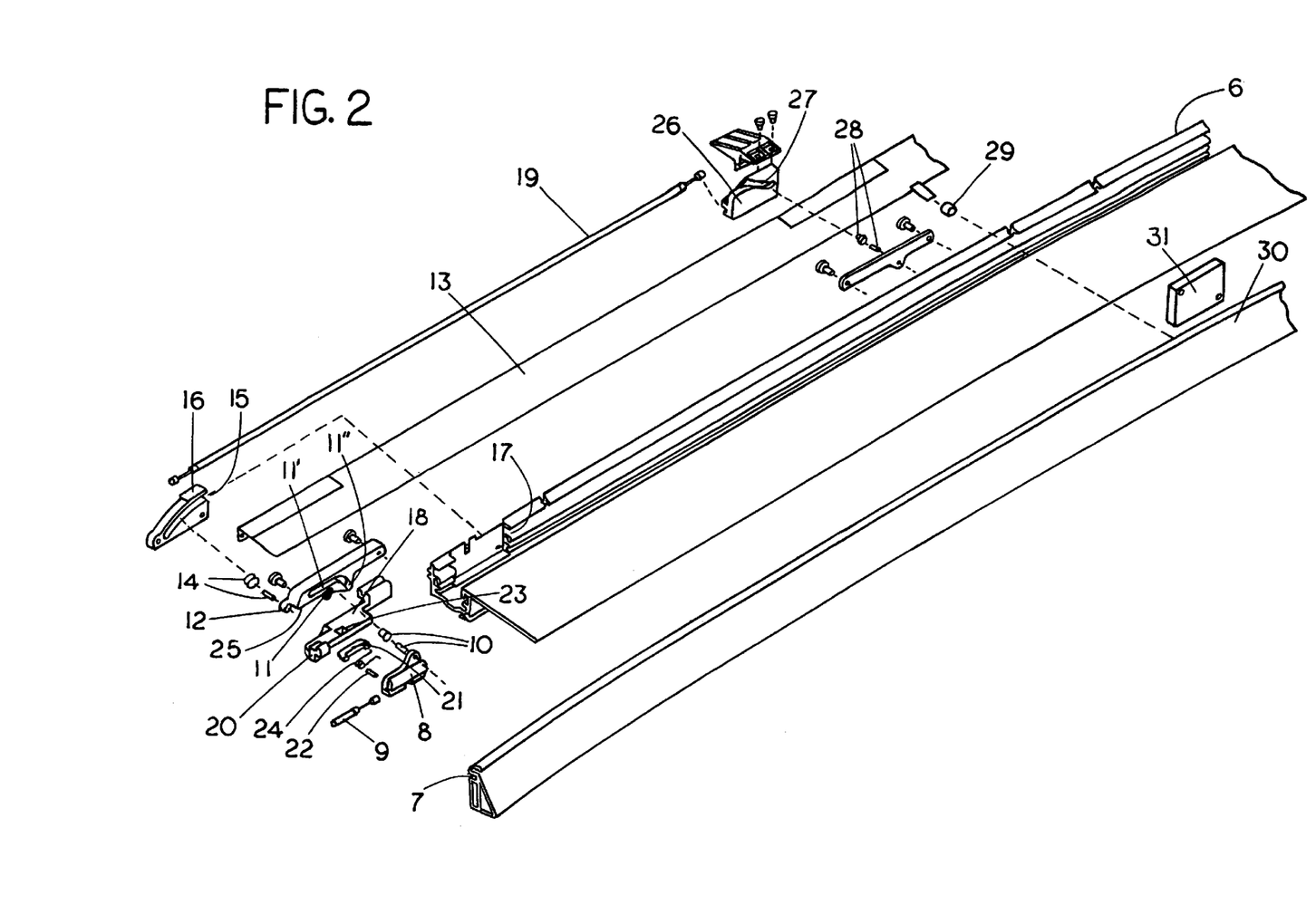
FIG. 2 is a larger-scale perspective exploded view of the operating mechanism of the open roof construction of FIG. 1.

FIG. 2 clearly shows the first longitudinal guide 6 in the form of an extruded section or an injection-molded member, which comprises a main rail and auxiliary grooves for guiding the various parts of mechanism 5. Said mechanism comprises a front slideshoe 8 on the front side of the panel, which is in this case connected to a driving element, such as an electric motor or a crank, via a pull-push cable 9. The front slideshoe 8 is provided with a cross pin 10, which is in engagement with a guide slot 11 in a front support 12, which is attached to a side flange 13, which forms part of panel 4 and which is positioned under the side edge thereof. Guide slot 11 comprises a front, at least approximately horizontal part 11', and a downwardly sloping rear part 11", which joins the rear side of said front part 11'. In this embodiment guide slot 11 is closed at both ends, so that cross pin 10 will remain in constant engagement with guide slot 11.

Near its front ends, on the side remote from slideshoe 8, support 12 is provided with a cross pin 14, which is capable of engaging in a guide slot 15 in an element 16 which in principle forms part of the first longitudinal guide 6, and which is rigidly mounted thereon. Said guide slot 15 extends in upward and rearward direction from the front side, in a slightly curved or possibly straight path, and it is open on the rear side, so that cross pin 14 can exit said guide slot 15, after which cross pin 14 will land in a horizontal slot 17 in longitudinal guide 6, whereby slots 15 and 17 can be regarded as one slot.

Figures 3A, 3B, 3C:
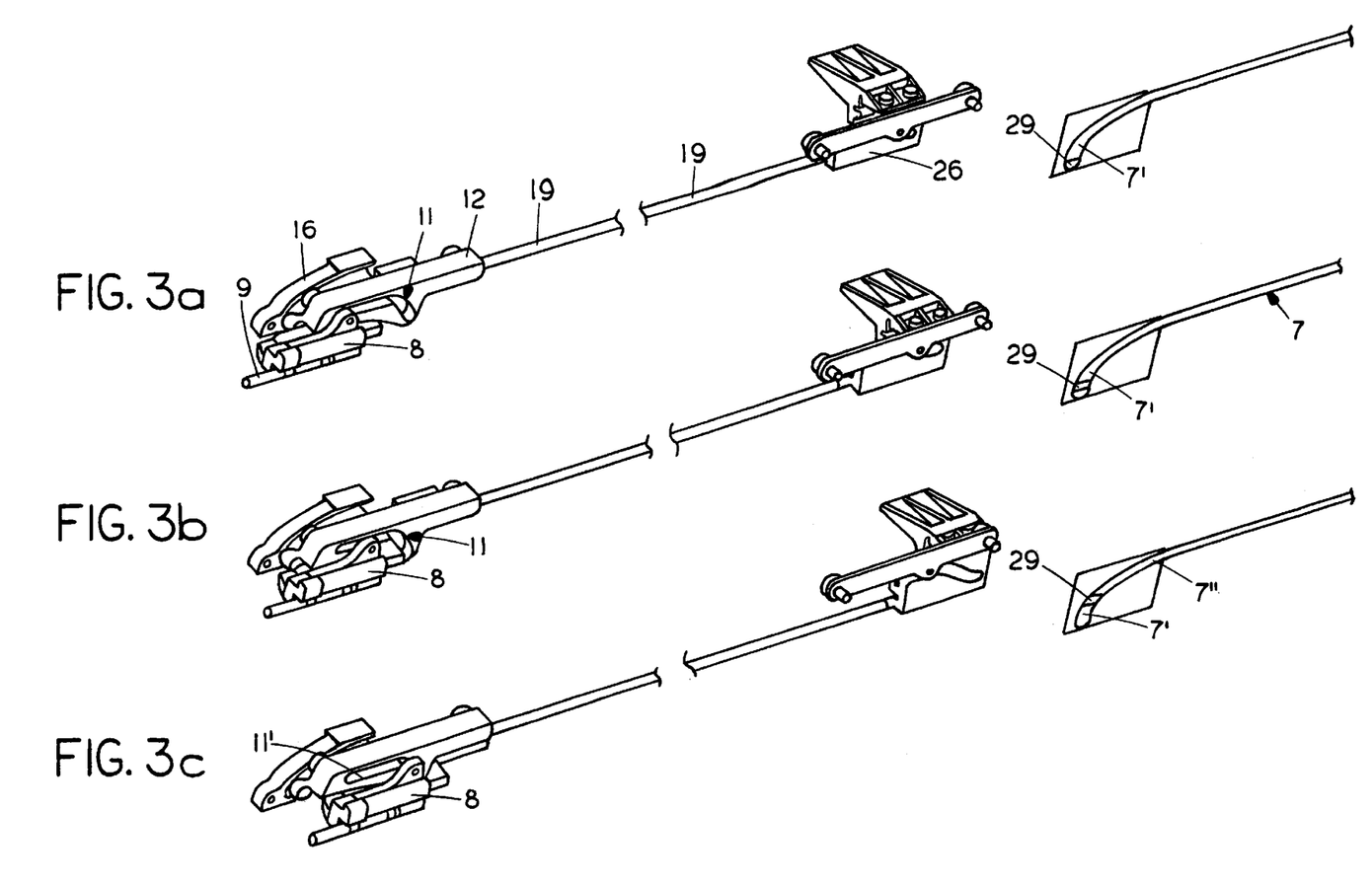
FIGS. 3A–F are perspective views of the operating mechanism of FIG. 2 in the positions of the open roof construction as shown in FIGS. 1A–F.
Figures 3D, 3E, 3F:
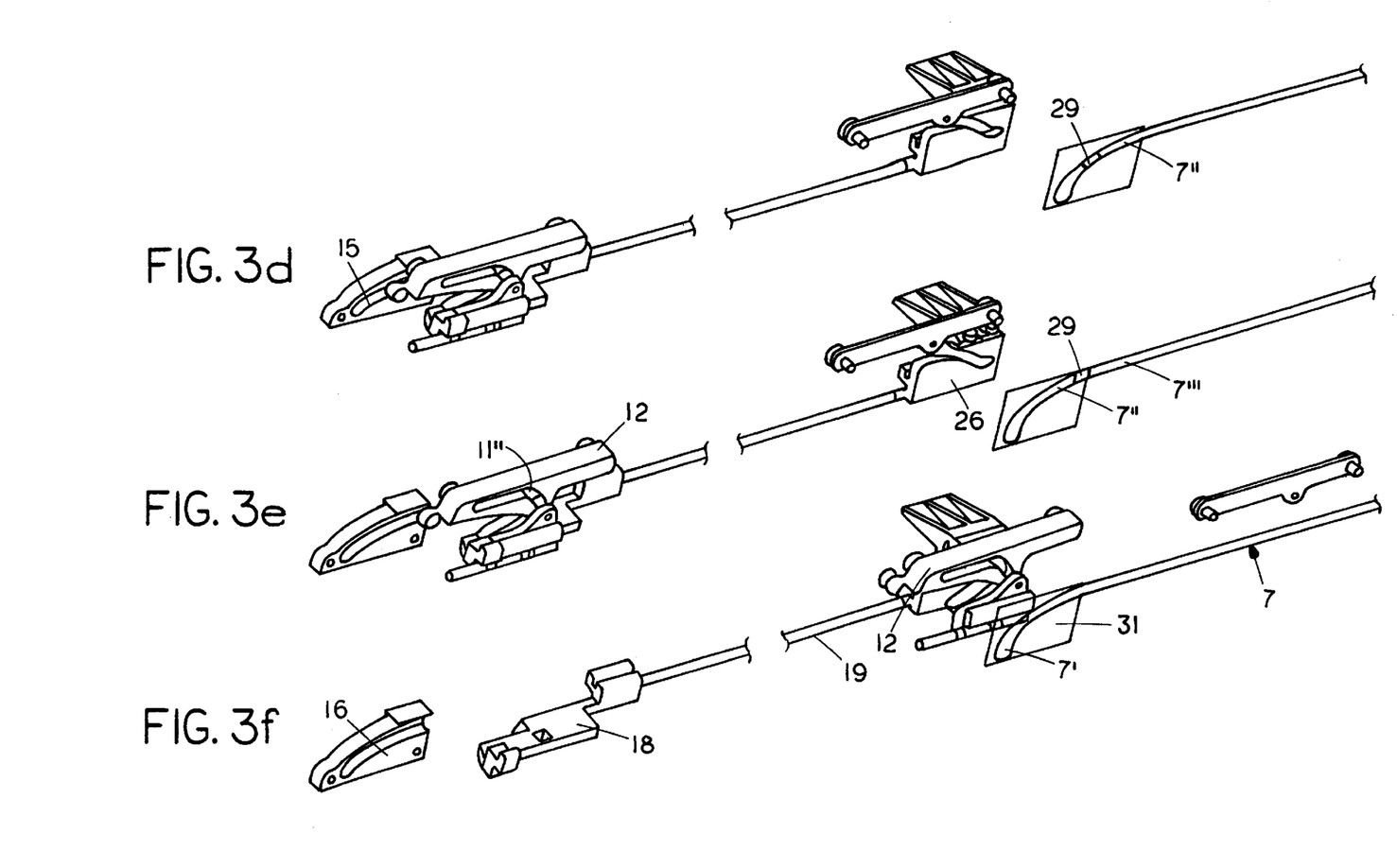

FIG. 3 furthermore shows a coupling element 18, which can provide a temporary coupling, via a pull-push cable 19 or another pressure-rigid connecting element, between the front slideshoe 8 and part of mechanism 5 which are yet to be described in more detail. Coupling element 18 is guided in longitudinal guide 6, and it comprises a stop member 20 near its front end, against which slideshoe 8 can strike when moving in forward direction. A temporary coupling between coupling element 18 and front slideshoe 8 upon rearward movement of slideshoe 8 can be provided by a coupling element in the shape of a hook 21, which pivots in a vertical direction about a pin 22 on front slideshoe 8, and which can engage with its nose in a recess 23 in the upper surface of coupling element 18, so as to effect a coupling between coupling element 18 and front slideshoe 8. Hook 21 is biassed in upward direction, that is, in a direction in which hock 21 moves out of the recess, by means of a torsion spring 24, while the downward movement, that is, in the coupling direction, is controlled by the movement of the front support 12 with respect to coupling element 18, to which end the bottom side of front support 12, which is configured as a camway 25, is in engagement with the upper side of hook 21.

As discussed above, coupling element 18, together with pull-push cable 19, provides a temporary coupling between front slideshoe 8 and a rear slideshoe 26, which is configured as a locking element or locking mechanism for locking and/or properly sealing panel 4 in the closed position thereof. The rear slideshoe 26 is provided with a locking slot 27, which is open on its front side and which slopes downwards in a slightly curved path from the front side, and which is closed at its rear end. A locking pin 28, which is attached to side flange 13, can come into engagement with said locking slot 27 near the closed position of the panel.

An outwardly projecting pin 29 is furthermore mounted on the side flange 13 of panel 4, near the rear side of said panel, which projecting pin 29 functions as a guide element and which is in constant engagement with second longitudinal guide 7, which is configured as a guide slot. The longer horizontal part of the guide slot of second longitudinal guide 7 is accommodated in an extruded section or an injection-molded member 30, while the front part of the longitudinal guide, which has a curved configuration, is provided in a separate block 31 of plastic material or of aluminium, which is mounted on the front side of extruded section 30. Located at the front end of second longitudinal guide 7 are a short, at least approximately vertical locking part 7', and an upwardly and rearwardly sloping part 7", which joins part 7', and which joins further horizontal part 7''' at its other end.

Figure 4:
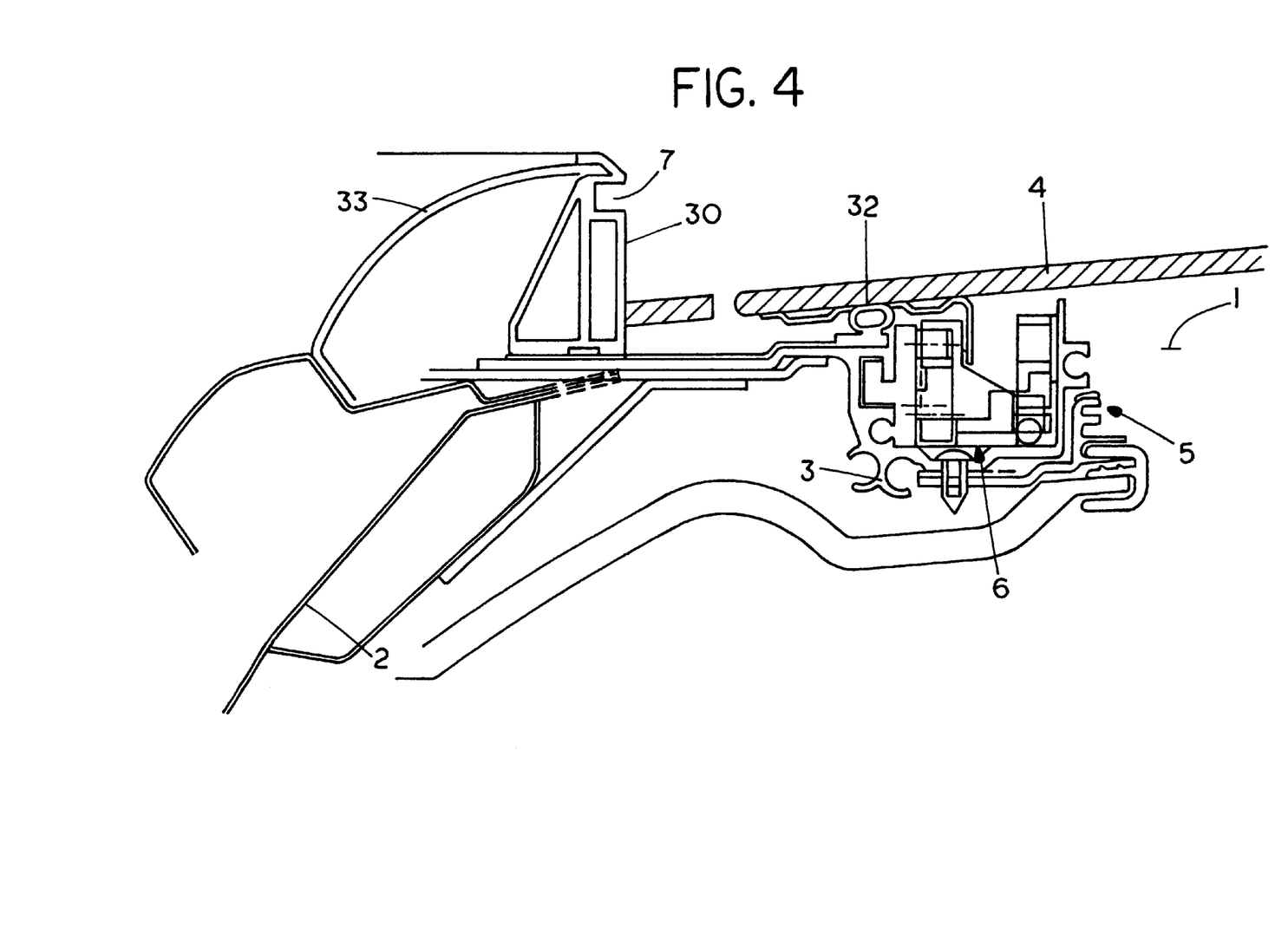
FIG. 4 is a larger-scale, cross-sectional view along line IV—IV in FIG. 1.

FIG. 4 furthermore shows that the sealing of the panel in the closed position takes place by means of a rigidly mounted sealing section 32, which forms a seal against the underside of the panel. The space outwardly thereof forms the wet part, which may function as a water drain. FIG. 4 furthermore shows that a cover 33 could be provided on the outside of second longitudinal guide 7, in order to integrate second longitudinal guide 7 more into the roof.

Figure 1A:
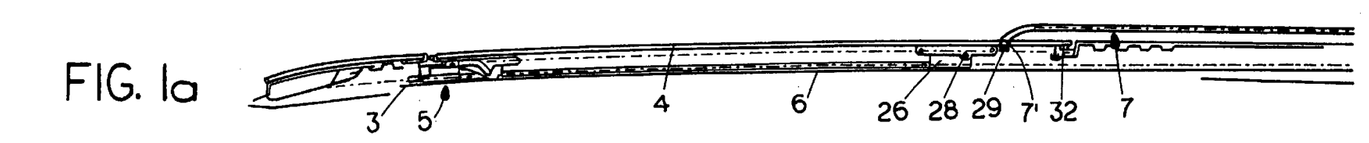
FIGS. 1A–F are longitudinal sectional views of a vehicle roof comprising the open roof construction according to the invention, showing various positions of the closing element.
Figure 5A:
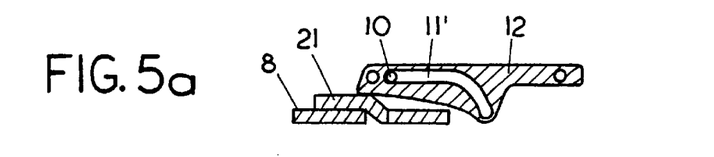
FIGS. 5a–5e are cross-sectional views illustrating the operation of a hook.
Figure 5B:
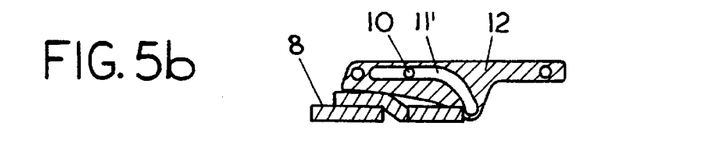

The operation of the open roof construction described above and illustrated in the drawings is as follows. FIGS. 1A, 3A and 5A show panel 4 in its closed and locked position. Cross pin 10 of front slideshoe 8 is positioned at the front end of guide slot 11 of front support 12, while cross pin 14 of front support 12 is positioned at the front end of guide slot 15. Hook 21 on front slideshoe 8 is in engagement with recess 23 of coupling element 18 (see also the separate sectional view of FIG. 1), so that the front and rear slideshoes 8 and 26 respectively are coupled via coupling element 18, 19. Locking pin 28 of panel 4 is positioned exactly at the rear end of locking slot 27 in rear slideshoe 26. The rear guide pin 29 is positioned at the bottom end of vertical locking part 7' of second longitudinal guide 7.

Figure 1B:
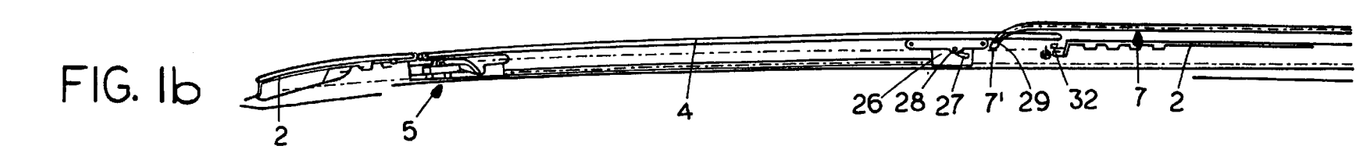

In the position which is shown in FIGS. 1B and 3B, the front slideshoe 8 has been moved rearwardly over a small distance by means of pull-push cable 9. Cross pin 10 has thereby been moved through guide slot 11 over the same distance, and since guide slot 11 extends horizontally, front support 12 will remain at the same level, as a result of which cross pin 14 remains present at the front end of stationary guide slot 15, because the sloping configuration of guide slot 15 only allows movement of pin 14 through guide slot 15 if the front support 12 moves upwards. Thus, panel 4 remains in the front position. Since front support 12 keeps hook 21 of front slideshoe 8 in engagement with recess 23 in coupling element 18, coupling element 18, and thus pull-push cable 19 and rear slideshoe 26, move along therewith. As a result, locking slot 27 is moved with respect to locking pin 28, and locking pin 28 has exited the very short horizontal part, which functions to allow some play and provide stability for the panel movement, and has arrived in the sloping part, so that the panel has moved upwards over a small distance on the rear side, as a result of which also guide pin 29 has moved slightly upwards in vertical locking part 7' of second longitudinal guide 7. As is shown in FIG. 1B, panel 4 has in the meantime become detached from sealing section 32 at the rear edge.

Figure 1C:
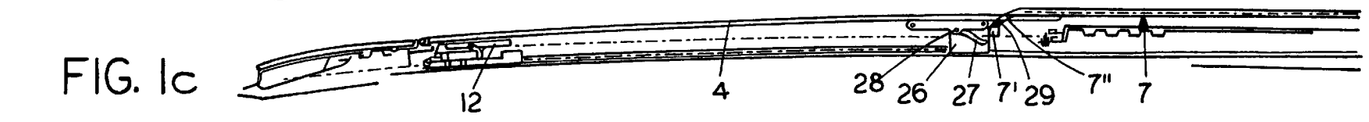
Figure 5C:
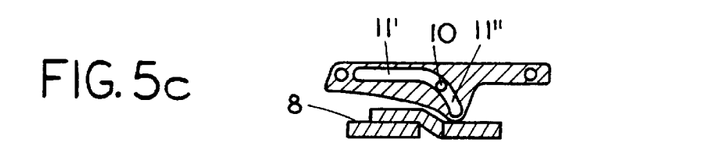

In the position which is shown in FIGS. 1C, 3C and 5C front slideshoe 8 has meanwhile been moved rearward over such a distance that cross pin 10 has reached the sloping rear part 11" of guide slot 11, and has thus moved front support 12 slightly upwards as well. As a result, cross pin 14 of front support 12 has started to move in guide slot 15, whereby said movement is determined by the angle at which slots 11 and 15 cross each other. Said movement is also partially influenced by the pivoting of front support 12 and/or panel 4 by the upward movement of the rear side of panel 4, which is caused by the movement of locking pin 28 in locking slot 27 of rear slideshoe 26, which is still fixedly connected to front slideshoe 8. In the meantime guide pin 29 has reached the transition between the vertical locking part 7' and the sloping part 7" of second longitudinal guide 7 in this position. Locking pin 28 has in principle exited locking slot 27.

Figure 1D:
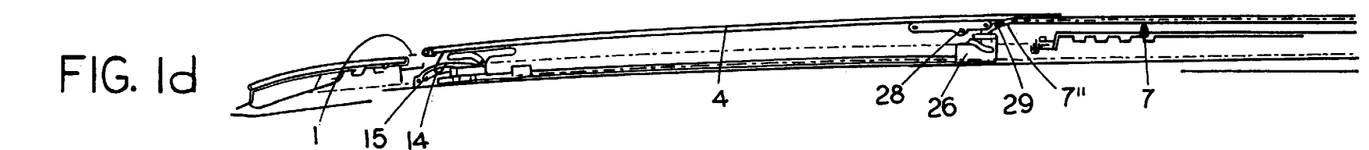
Figure 5D:
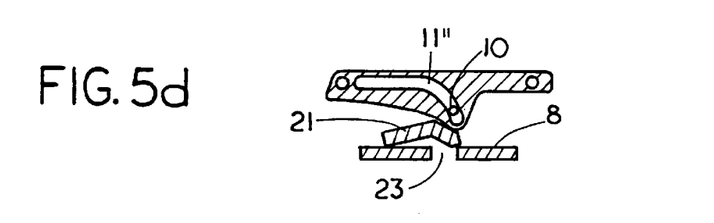

FIGS. 1D, 3D and 5D show slideshoe 8 to have moved further rearwardly, whereby pins 10 and 14 have been moved further in guide slots 11 and 15 respectively, and whereby locking pin 28 has completely exited locking slot 27 on the rear side of the panel, so that control of the movement of the rear side of panel 4 has been taken over by guide pin 29, which moves in the sloping part 7" of longitudinal guide 7. In the meantime, front support 12 has moved so far upwardly with respect to coupling element 18, that the nose of hook 21 of front slideshoe 8 nearly exits recess 23 in coupling element 18.

Figure 1E:
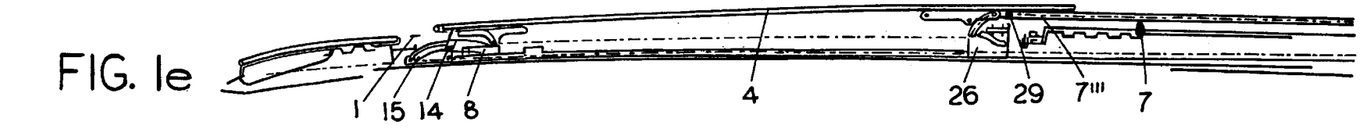
Figure 5E:
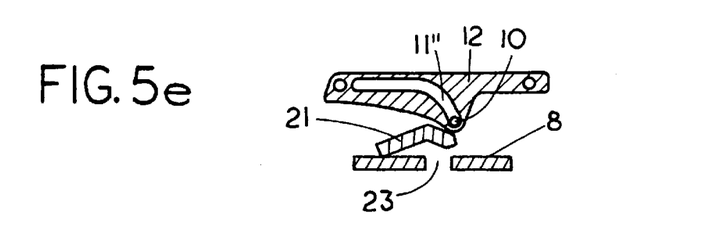

In the position which is shown in FIGS. 1E, 3E and 5E, the front slideshoe 8 has in the meantime been moved rearwards so far that cross pin 10 has reached the end of guide slot 11, cross pin 14 is positioned at the transition between guide slot 15 and horizontal slot 17, and guide pin 29 has arrived at the transition between sloping part 7" and horizontal part 7''' of the two longitudinal guides 7. Consequently, there will be no further vertical movement of panel 4 other than one caused by a possibly curved or sloping part of first or second longitudinal guide 6, 7. Front support 13 has in the meantime been moved so far in horizontal and vertical direction with respect to coupling element 18, that hook 21 has been completely removed from recess 23 by means of torsion spring 24, as a result of which front slideshoe 8 and rear slideshoe 26 are no longer coupled, so that rear slideshoe 26, and thus the locking mechanism, remain stationary. A spring (not shown), for example a tension spring, which engages rear slideshoe 26 or one of the other parts of the locking mechanism, provides a rearward load on rear slideshoe 26, ensuring thereby that said slideshoe will remain in its rearmost position until front slideshoe 8 meets the stop of coupling element 18, after which hook 21 effects the coupling between slideshoe 8 and coupling element 18 again.

Figure 1F:
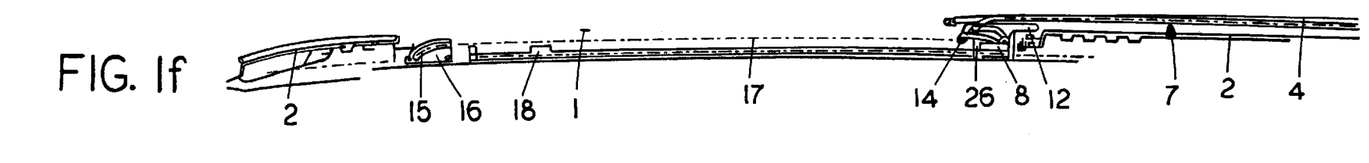

As is shown in FIGS. 1F and 3F, coupling element 18 and rear slideshoe 26 have indeed remained at the same position, and front slideshoe 8 has moved panel 4 completely rearwards, thereby clearing the roof opening to a large degree. Because of the fact that panel 4 has pivoted over a relatively small distance, but has been moved slightly upwards, panel 4 can be moved in rearward direction close to fixed roof 2, so that it will hardly project above fixed roof 2.

From the foregoing it will be apparent, that the invention provides an open roof construction which comprises a panel which is supported in a stable manner, and which enables movement in such a manner that the panel can be moved in rearward direction quite close to the fixed roof, to such a large extent that the larger part of the roof opening is cleared.

The invention is not limited to the embodiment which is shown in the drawings and which has been described above, which can be varied in various ways within the scope of the present invention.

What is claimed is:

1. An open roof construction for a vehicle having a roof opening in its fixed roof, comprising:

a drive unit;

a stationary part secured to the roof of the vehicle, the stationary part being provided with at least a first longitudinal guide extending along the roof opening, and with a second longitudinal guide on the fixed roof, rearward of the roof opening, said second longitudinal guide comprising a front, short, at least approximately vertical part and a part simultaneously upwardly and rearwardly extending, which joins said vertical part upwardly thereof; and a moveable closing element, which is movably supported by said stationary part and which is adjustable by the drive unit, said closing element being movable between a closed position, in which the roof opening is closed, and an open, rearward position, at least partially above the fixed roof, in which the roof opening is at least partially cleared, the closing element being supported near its front side by a slideshoe which is slidably supported in said first longitudinal guide, and which is supported rearward thereof, by a guide element which is slidable in said second longitudinal guide;

a locking mechanism on a rearward end of the open roof construction, which is driven by said drive unit, which locking mechanism temporarily engages a co-acting part attached to the closing element near the closed position thereof, and which moves the closing element when the guide element of the closing element is disposed in said substantially vertical part of said second longitudinal guide.

2. An open roof construction for a vehicle having a roof opening in its fixed roof, comprising:

a drive unit;

a stationary part secured to the roof of the vehicle, the stationary part being provided with at least a first longitudinal guide extending along the roof opening, and with a second longitudinal guide on the fixed roof, rearward of the roof opening, said second longitudinal guide comprising a front, short, at least approximately vertical part and an upwardly and rearwardly extending vertical part, which joins said part upwardly thereof; and a moveable closing element, which is movably supported by said stationary part and which is adjustable by the drive unit, said closing element being movable between a closed position, in which the roof opening is closed, and an open, rearward position, at least partially above the fixed roof, in which the roof opening is at least partially cleared, the closing element being supported near its front side by a slideshoe which is slidably supported in said first longitudinal guide, and which is supported rearward thereof, by a guide element which is slidable in said second longitudinal guide;

a locking mechanism on a rearward end of the open roof construction, which is driven by said drive unit, which locking mechanism temporarily engages a co-acting part attached to the closing element near the closed position thereof, and which moves the closing element when the guide element of the closing element is disposed in said substantially vertical part of said second longitudinal guide; and wherein said drive unit engages the front slideshoe and wherein a releasable coupling element is provided between said front slideshoe and a rear slideshoe of said locking mechanism for temporarily driving said locking mechanism.

3. An open roof construction according to claim 2, wherein said co-acting part comprises a portion of a pin-slot connection, wherein one of said pin and said slot is disposed at said closing element and the other of said pin and said slot is disposed at said rear slideshoe.

4. An open roof construction according to claim 2, wherein said closing element comprises an element for height adjustment on its front side, which element is in slidable engagement with the slideshoe, the coupling element being provided with a releasable coupling element, which is releasably coupleable to said slideshoe, and which is controlled by said element for height adjustment.

5. An open roof construction according to claim 4, wherein said coupling element includes a hook which pivots about a horizontal pin on the slideshoe, which hook is releasably engageable with an opening in said coupling element, and which is controlled by the bottom side of said element for height adjustment.

* * * * *

UNITED STATES PATENT AND TRADEMARK OFFICE
CERTIFICATE OF CORRECTION

PATENT NO. : 6,012,768
DATED : January 11, 2000
INVENTOR(S) : Martinus Wilhelmus Nabuurs et al.

It is certified that error appears in the above-identified patent and that said Letters Patent is hereby corrected as shown below:

On the title page, item

Under [56] References Cited
FOREIGN PATENT DOCUMENTS

Please add the following references:

—4238944  10/1993  Germany
 4238945  11/1993  Germany
 4227400  02/1994  Germany Signed and Sealed this Thirteenth Day of February, 2001

Attest:

NICHOLAS P. GODICI

Attesting Officer   Acting Director of the United States Patent and Trademark Office